US011592177B2

(12) United States Patent
Chandra et al.

(10) Patent No.: US 11,592,177 B2
(45) Date of Patent: Feb. 28, 2023

(54) PURGING CONFIGURATION FOR COMBUSTOR MIXING ASSEMBLY

(71) Applicant: General Electric Company, Schenectady, NY (US)

(72) Inventors: Hari Ravi Chandra, Bangalore (IN); Jayanth Sekar, Bangalore (IN); Gurunath Gandikota, Bangalore (IN); Michael A. Benjamin, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 8 days.

(21) Appl. No.: 17/232,433

(22) Filed: Apr. 16, 2021

(65) Prior Publication Data

US 2022/0333781 A1 Oct. 20, 2022

(51) Int. Cl.

*F02C 7/268* (2006.01)
*F23R 3/28* (2006.01)
*F23D 14/64* (2006.01)
*F23R 3/34* (2006.01)
*F23R 3/14* (2006.01)

(52) U.S. Cl.

CPC .............. *F23R 3/286* (2013.01); *F23D 14/64* (2013.01); *F23R 3/14* (2013.01); *F23R 3/343* (2013.01); *F05D 2240/127* (2013.01); *F05D 2240/35* (2013.01); *F23D 2206/10* (2013.01); *F23D 2900/14021* (2013.01); *F23D 2900/14701* (2013.01)

(58) Field of Classification Search

CPC ............. F23R 3/343; F23R 3/286; F23R 3/14
See application file for complete search history.

(56) References Cited

U.S. PATENT DOCUMENTS

| | | | | |
|---|---|---|---|---|
| 5,417,054 | A | 5/1995 | Lee et al. | |
| 5,701,732 | A | 12/1997 | Nesbitt et al. | |
| 6,073,436 | A | 6/2000 | Bell et al. | |
| 6,418,726 | B1 * | 7/2002 | Foust | F23R 3/14 60/776 |
| 6,543,235 | B1 | 4/2003 | Crocker et al. | |
| 6,898,938 | B2 * | 5/2005 | Mancini | F23R 3/286 60/740 |
| 8,443,609 | B2 | 5/2013 | Doerr et al. | |
| 9,771,869 | B2 | 9/2017 | Li et al. | |

(Continued)

*Primary Examiner* — Katheryn A Malatek
(74) *Attorney, Agent, or Firm* — Venable LLP; Peter T. Hrubiec; Michele V. Frank

(57) ABSTRACT

A mixing assembly for a combustor includes: a pilot mixer including a pilot housing extending along a mixer centerline and a pilot fuel nozzle; a main mixer surrounding the pilot mixer; a fuel manifold between the pilot and main mixers; a mixer foot extending from a main housing of the main mixer; a main swirler body surrounding the main housing defining a mixing channel between the main housing and the main swirler body; and a main fuel ring in the mixing channel connected to the main housing by main fuel vanes, at least one of the main fuel ring and main fuel vanes including fuel injection ports for discharging fuel into the mixing channel, wherein the fuel injection ports are disposed non-uniformly relative to the mixer centerline, so as to produce a static pressure difference therebetween in response to mixer air flow passing around the main fuel ring.

20 Claims, 13 Drawing Sheets

(56) References Cited

U.S. PATENT DOCUMENTS

| | | | | |
|---|---|---|---|---|
| 9,909,500 | B2 | 3/2018 | Ott et al. | |
| 10,094,565 | B2 | 10/2018 | Tanaka et al. | |
| 10,184,665 | B2 * | 1/2019 | Benjamin | F02C 7/22 |
| 2007/0028618 | A1 * | 2/2007 | Hsiao | F23R 3/343<br>60/737 |
| 2009/0255262 | A1 * | 10/2009 | McMasters | F23R 3/34<br>60/742 |
| 2010/0012750 | A1 * | 1/2010 | Duncan | F23R 3/28<br>239/265.19 |
| 2012/0285173 | A1 * | 11/2012 | Poyyapakkam | F23C 7/004<br>60/748 |
| 2012/0297787 | A1 * | 11/2012 | Poyyapakkam | F23D 14/62<br>60/738 |
| 2017/0350598 | A1 * | 12/2017 | Boardman | F23R 3/14 |
| 2017/0370585 | A1 * | 12/2017 | Boardman | F23R 3/06 |
| 2017/0370588 | A1 * | 12/2017 | Boardman | F02C 3/04 |
| 2018/0142894 | A1 * | 5/2018 | Stytsenko | B22F 10/20 |
| 2019/0101062 | A1 * | 4/2019 | Vise | F02C 9/28 |

* cited by examiner

PURGING CONFIGURATION FOR COMBUSTOR MIXING ASSEMBLY

BACKGROUND OF THE INVENTION

The present invention relates generally to combustors, and more particularly to gas turbine engine combustor mixing assemblies.

A gas turbine engine typically includes, in serial flow communication, a low-pressure compressor or booster, a high-pressure compressor, a combustor, a high-pressure turbine, and a low-pressure turbine. The combustor generates combustion gases that are channeled in succession to the high-pressure turbine where they are expanded to drive the high-pressure turbine, and then to the low-pressure turbine where they are further expanded to drive the low-pressure turbine. The high-pressure turbine is drivingly connected to the high-pressure compressor via a first rotor shaft, and the low-pressure turbine is drivingly connected to the booster via a second rotor shaft.

One type of combustor known in the prior art includes an annular dome assembly or mixing assembly interconnecting the upstream ends of annular inner and outer liners. Typically, the dome assembly is provided with swirlers having arrays of vanes. The vanes are effective to produce counter-rotating air flows that generate shear forces which break up and atomize injected fuel prior to ignition. This type may be referred to as twin annular premixed swirler or "TAPS" type combustor.

This type of combustor may be staged, i.e. it may include one or more pilot fuel injectors and one or more main fuel injectors. Depending on the engine operating condition, the fuel flow rate through the fuel injectors may vary. In some engine operating conditions, the main fuel injectors may be entirely shut off (known as "pilot-only operation").

A particular concern is the formation of carbon (or "coke") deposits in fuel carrying components including fuel injectors when a hydrocarbon fuel (liquid or gas) is exposed to high temperatures in the presence of oxygen.

It will be understood that each fuel injector is generally a metallic mass including numerous small passages and orifices. The fuel nozzles are subject to the formation of carbon (or "coke") deposits when a hydrocarbon fuel is exposed to high temperatures in the presence of oxygen. This process is referred to as "coking" and is generally a risk when temperatures exceed about 177 degrees C. (350 degrees F.).

When fuel stops flowing through one or more stages of the combustor, a volume of fuel will continue to reside in the fuel injectors and can be heated to coking temperatures. Small amounts of coke interfering with fuel flow through these orifices can make a large difference in fuel nozzle performance. Eventually, build-up of carbon deposits can block fuel passages sufficiently to degrade fuel nozzle performance or prevent the intended operation of the fuel nozzle to the point where cleaning or replacement is necessary to prevent adverse impacts to other engine hot section components and/or restore engine cycle performance.

BRIEF DESCRIPTION OF THE INVENTION

According to one aspect of the technology described a mixing assembly for a combustor includes: a pilot mixer including an annular pilot housing having a hollow interior extending along a mixer centerline and a pilot fuel nozzle mounted in the housing; a main mixer including: a main housing surrounding the pilot, the main housing having forward and aft ends; a fuel manifold positioned between the pilot housing and the main housing; a mixer foot extending outward from the main housing; a main swirler body including a plurality of vanes, the main swirler body surrounding the main housing such that an annular mixing channel is defined between the main housing and the main swirler body, and being coupled to the mixer foot; and a main fuel ring disposed in the mixing channel downstream of the mixer foot and connected to the main housing by an array of main fuel vanes, at least one of the main fuel ring and the main fuel vanes including a plurality of fuel injection ports positioned to discharge fuel into a central portion of the mixing channel, wherein the fuel injection ports are disposed non-uniformly relative to the mixer centerline, so as to produce a static pressure difference therebetween in response to mixer air flow passing around the main fuel ring.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
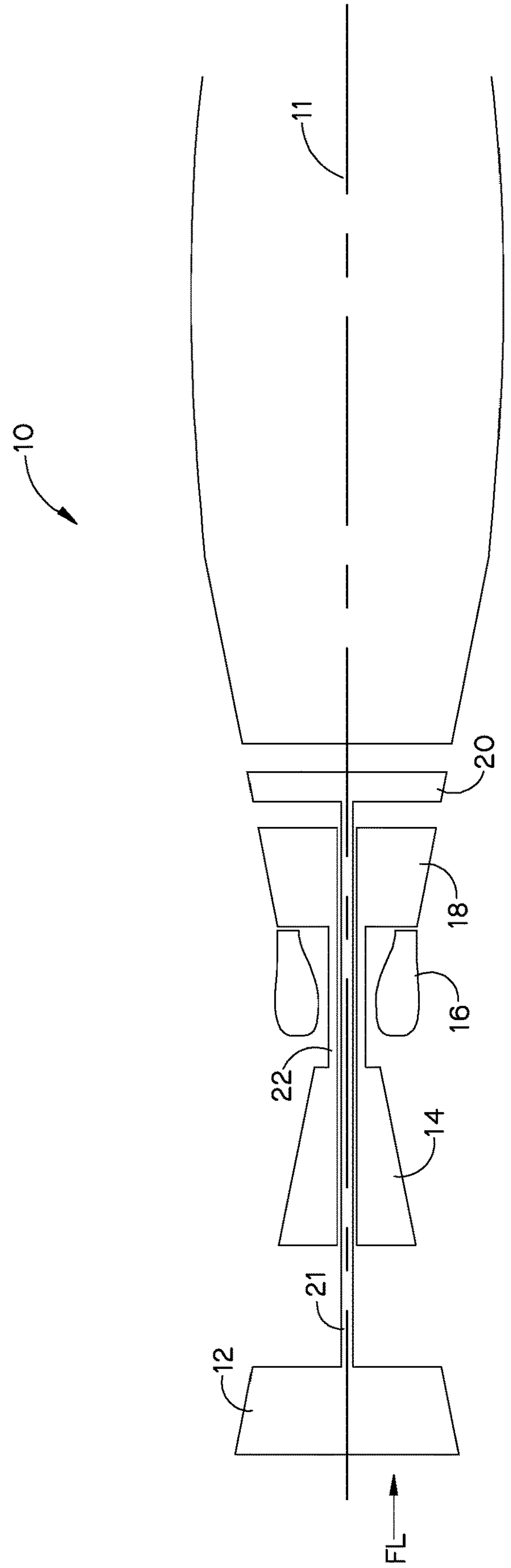
FIG. 1 is a schematic diagram of a gas turbine engine.

Referring to the drawings wherein identical reference numerals denote the same elements throughout the various views, FIG. 1 is a schematic illustration of a gas turbine engine 10 including a low-pressure compressor 12, a high-pressure compressor 14, and a combustor 16. The engine 10 also includes a high-pressure turbine 18 and a low-pressure turbine 20. The low-pressure compressor 12 and the low-pressure turbine 20 are coupled by a first shaft 21, and the high-pressure compressor 14 and turbine 18 are coupled by a second shaft 22. First and second shafts 21, 22 are disposed coaxially about a centerline axis 11 of the engine 10.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "FL" in FIG. 1. These directional terms are used merely for convenience in description and do not require a particular orientation of the structures described thereby.

In operation, air flows through the low-pressure compressor 12 and compressed air is supplied from low-pressure compressor 12 to high-pressure compressor 14. The highly compressed air is delivered to combustor, shown schematically at 16. Combustion gases from combustor 16 drive turbines 18 and 20 and exits gas turbine engine 10 through a nozzle 24.

Figure 2:
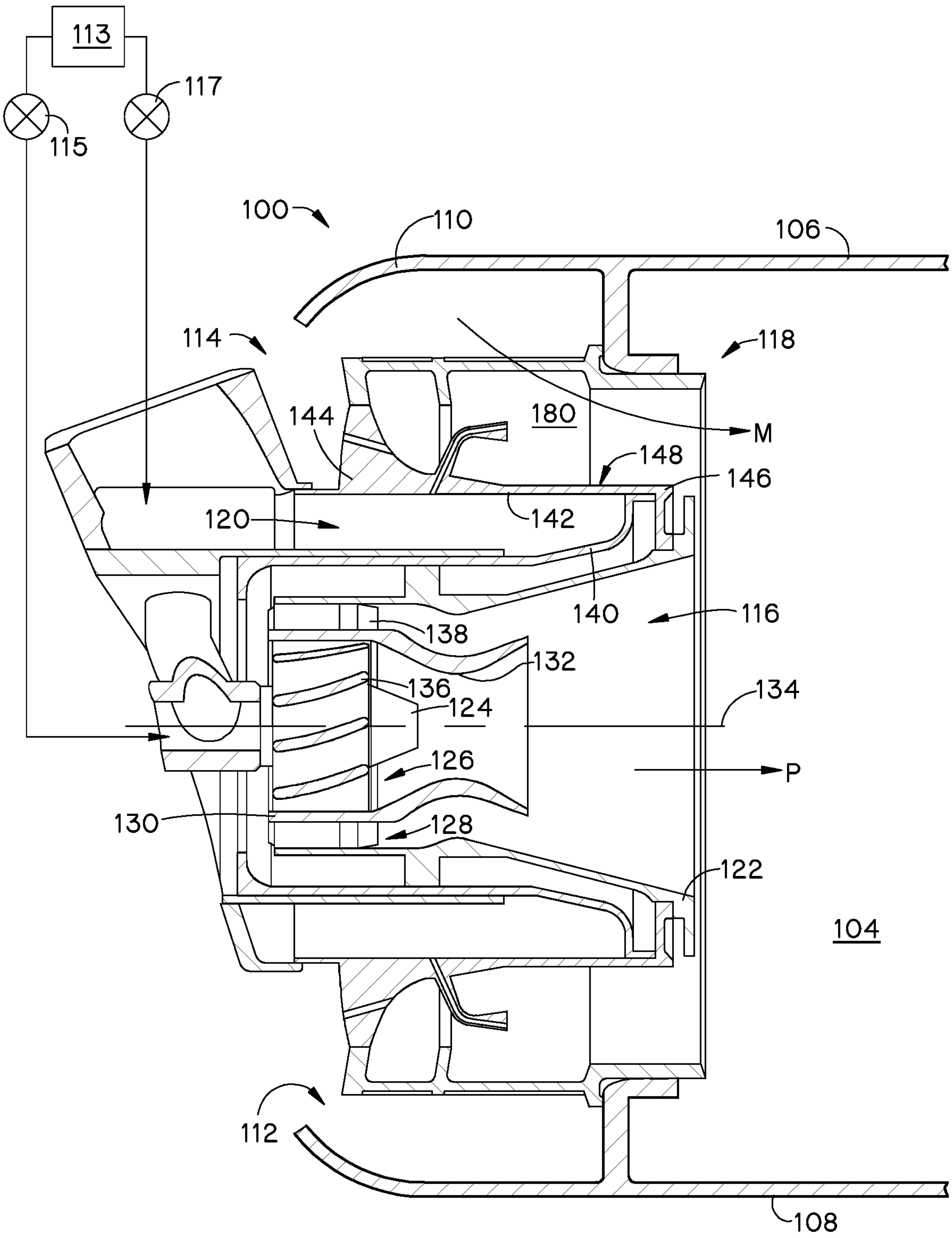
FIG. 2 is a schematic, cross-sectional view of a portion of a combustor suitable for use in the gas turbine engine shown in FIG. 1.

FIG. 2 shows the forward end of a combustor 100 having an overall configuration generally referred to as twin annular premixed swirler or "TAPS", suitable for incorporation into an engine such as engine 10 described above (e.g. in the location of combustor 16 of FIG. 1). The combustor 100 includes a hollow body defining a combustion chamber 104 therein. The hollow body is generally annular in form and is defined by an outer liner 106 and an inner liner 108. The upstream end of the hollow body is substantially closed off by a cowl 110 attached to the outer liner 106 and to the inner liner 108. At least one opening 112 is formed in the cowl 110 for the introduction of fuel and compressed air.

Located between and interconnecting the outer and inner liners 106, 108 near their upstream ends is a mixing assembly or dome assembly 114. The mixing assembly 114 includes a pilot mixer 116, a main mixer 118, and a fuel manifold 120 positioned therebetween. In operation, a pilot airflow "P" passes through the pilot mixer 116, and a mixer airflow "M" passes through the main mixer 118. It will be seen that pilot mixer 116 includes an annular pilot housing 122 having a hollow interior and a pilot fuel nozzle 124 mounted in pilot housing 122 which is adapted for dispensing droplets of fuel to the hollow interior of pilot housing 122. Further, pilot mixer 116 includes an inner pilot swirler 126 located at a radially inner position adjacent pilot fuel nozzle 124, an outer pilot swirler 128 located at a radially outer position from inner pilot swirler 126, and a pilot splitter 130 positioned therebetween. Pilot splitter 130 extends downstream of pilot fuel nozzle 124 to form a venturi 132 at a downstream portion.

The inner and outer pilot swirlers 126 and 128 are generally oriented parallel to a mixer centerline 134 through mixing assembly 114 and include a plurality of vanes for swirling air traveling therethrough. More specifically, the inner pilot swirler 126 includes an annular array of inner pilot swirl vanes 136 disposed about mixer centerline 134. The inner pilot swirl vanes 126 are angled with respect to the mixer centerline 134 so as to impart a swirling motion (i.e., tangential velocity component) to the air flow passing therethrough.

The outer pilot swirler 128 includes an annular array of outer pilot swirl vanes 138 disposed coaxially about mixer centerline 134. The outer pilot swirl vanes 138 are angled with respect to the mixer centerline 134 so as to impart a swirling motion (i.e., tangential velocity component) to the air flow passing therethrough.

The main mixer 118 further includes an annular shroud 140 radially surrounding pilot housing 122 and an annular main housing 142 radially surrounding the shroud 140. The main housing 142 cooperates with the shroud 140 to define the fuel manifold 120.

The specific configuration of the shroud 140, pilot housing 122, and main housing 142 is merely one example of a possible structure to form the main mixer 118. Alternatively, some or all of the shroud 140, pilot housing 122, and main housing 142 may be combined into part of an integral, unitary or monolithic structure.

Figure 3:
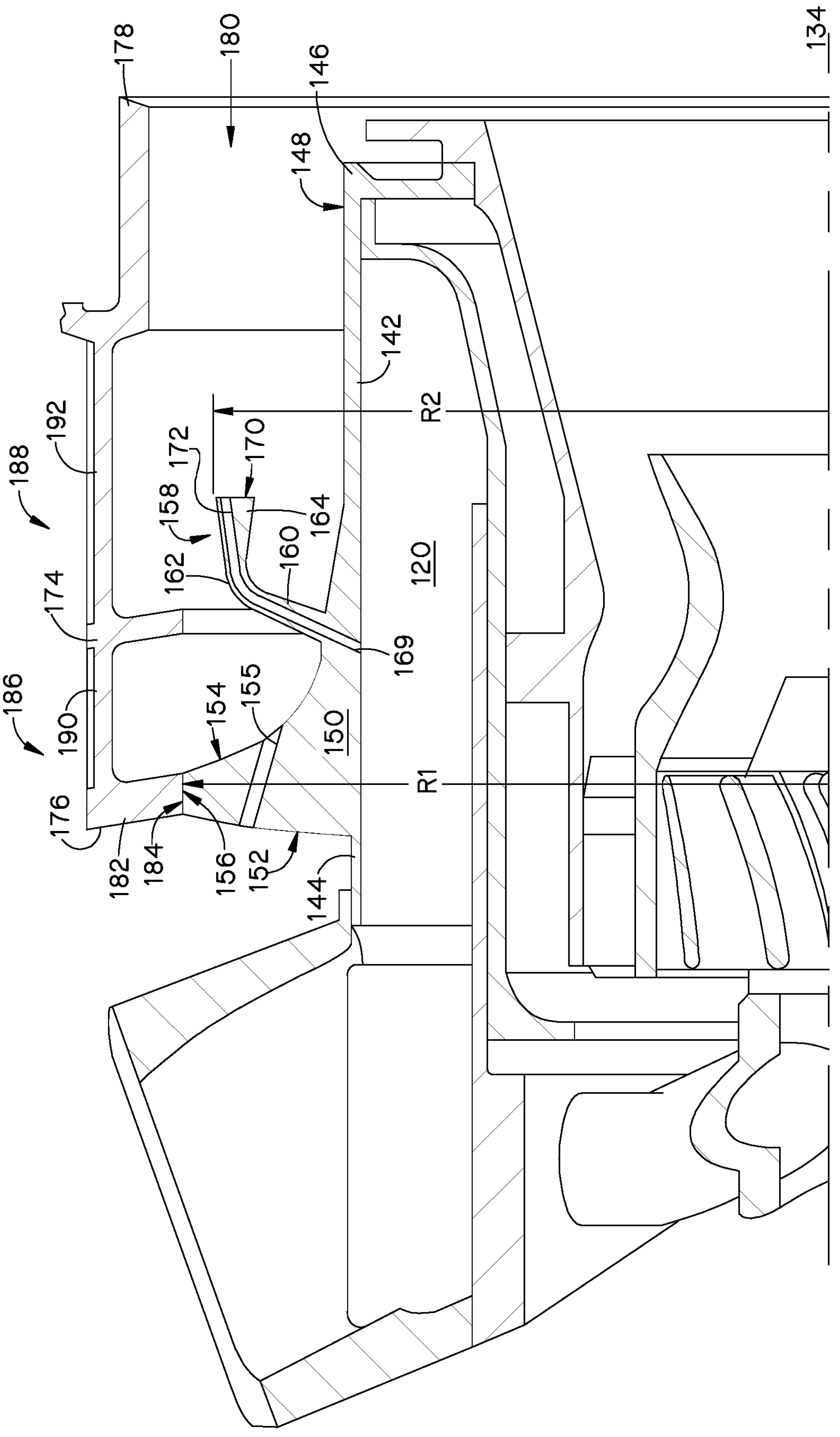
FIG. 3 is an enlarged view of a portion of FIG. 2.

The main housing 142 extends between a forward end 144 and an aft end 146. The overall shape of its outer surface 148 is generally cylindrical. Referring to FIG. 3, at the forward end 144, the main housing 142 extends radially outward to define a mixer foot 150. The mixer foot 150 is generally shaped like a tapered disk with a forward face 152 and an opposed aft face 154, interconnected by a generally radially outward facing outer surface 156. In this example, the forward face 152 is oriented close to parallel to the radial direction and the aft face 154 is sloped at an acute angle relative to the radial direction, smoothly transitioning into the remainder of the main housing 142. A plurality of slots 155 pass through the mixer foot 150.

A main fuel ring 158 is disposed around and spaced outboard from the main housing 142. A plurality of struts or fuel vanes 160 extend between the main housing 142 and the main fuel ring 158 to support and position the main fuel ring 158.

The dimensions of the mixer foot 150 and the main fuel ring 158 are selected such that that the outer extent of the mixer foot 150 (labeled radius "R1") is at a greater radius than an outer extent of the main fuel ring 158 (labeled radius "R2"). Stated another way, the mixer foot 150 protrudes further outboard than the main fuel ring 158.

Figure 4:
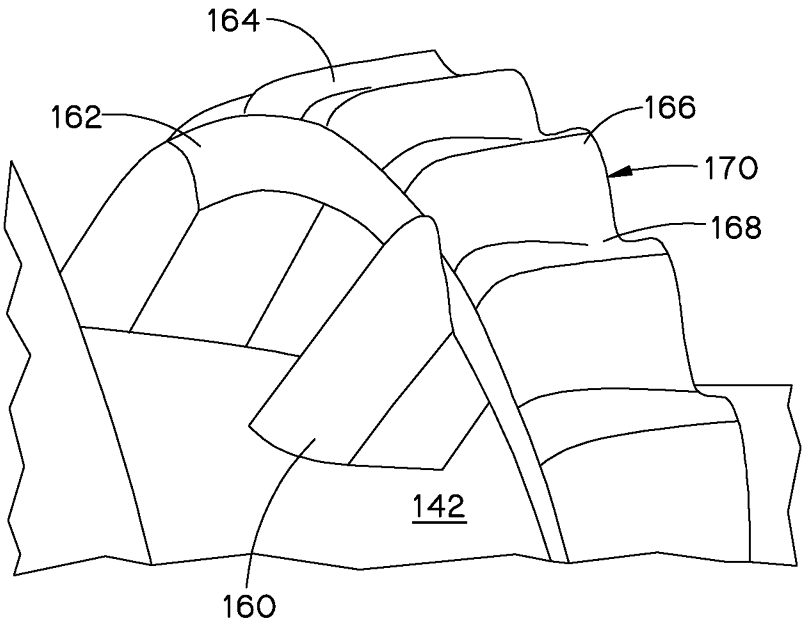
FIG. 4 is a schematic perspective view of a main fuel ring of the combustor shown in FIG. 2.
Figure 5:
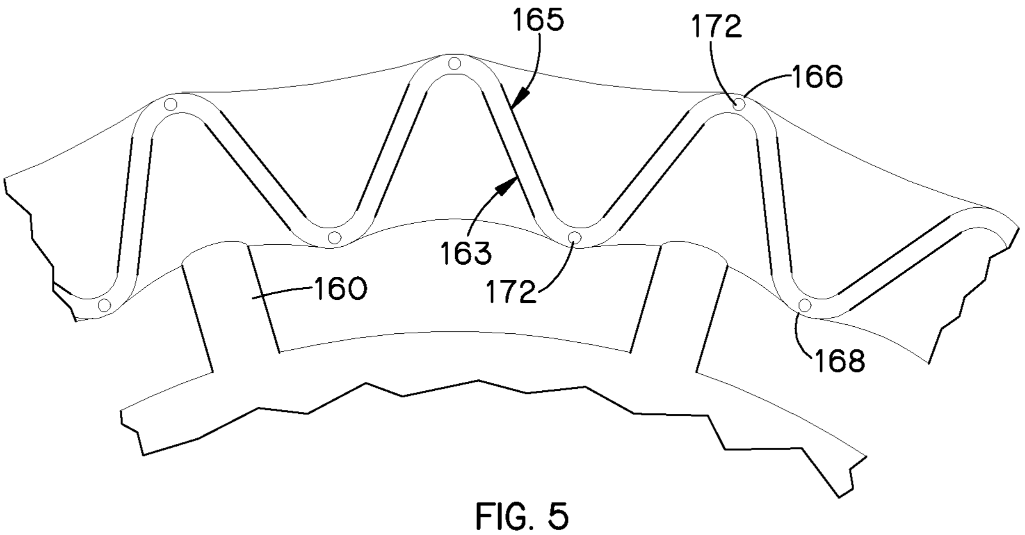
FIG. 5 is an aft elevation view of a portion of the main fuel ring shown in FIG. 4.

The main fuel ring 158 may be shaped to promote air/fuel mixing. In the illustrated example, the main fuel ring 158 has a continuous forward portion 162, blending into an aft portion 164 having an inboard surface 163 and an opposed outboard surface 165. In this particular example, the aft portion has an undulating shape with a radial array of convex outward peaks 166 alternating with concave outward chutes 168 (best seen in FIGS. 4 and 5). These may alternatively described as corrugations or chevrons. The aft portion 164 terminates in a generally flat aft-facing surface 170.

The main fuel ring 158 incorporates a plurality of fuel injection ports 172 which are effective to introduce fuel into a generally annular mixing channel 180. The number, shape, and location of the fuel injection ports 172 may be selected to suit a particular application. For example, the fuel injection ports 172 may be located on the aft-facing surface 170. In the illustrated example, one circular cross-section fuel injection port 172 is located at or near the apex of each peak 166 and each chute 168. The direction of discharge of fuel from the fuel injection ports 172 generally has a substantial axial component. It may be purely axial, or may include some radial component inward or outward, and/or some tangential component.

The fuel injection ports 172 are in fluid communication with fuel feed channels 173 which pass through the body of the main fuel ring 158 and through one or more of the main fuel vanes 160 to communicate with the main fuel manifold 120.

As illustrated (FIGS. 4, 5) the main fuel vanes 160 may have a streamlined shape. In one embodiment, the main fuel vanes 160 are configured so they do not introduce a tangential velocity component to air passing therethrough (i.e. they do not swirl the flow). Alternatively, the main fuel vanes 160 may be configured so they introduce a tangential velocity component air passing therethrough (i.e. swirl).

Referring back to FIG. 3, a main swirler body 174 surrounds the main housing 142. The main swirler body 174 extends between a forward end 176 which is mechanically coupled to the swirler foot 150 and an aft end 178. The generally annular mixing channel 180 is defined between the main housing 142 and the main swirler body 174.

The main swirler body 174 includes a forward bulkhead 182 at its forward end 176. The forward bulkhead 182 includes an inner surface 184 which is complementary to the outer surface 156 of the mixer foot 150.

The dimensional relationship described above (radius R1 greater than radius R2) permits the main swirler body 174 to be assembled to the main housing 142 in a practical manner. For example, the main swirler body 174 may be slipped over the main housing 142 in an axial direction from aft to forward. The forward bulkhead 182 is able to pass over the main fuel ring 158 without interference and is slid further forward until its inner surface 184 engages the outer surface 156 of the mixer foot 150. The forward bulkhead 182 and the mixer foot 150 may be configured to embody a specific fit as required, for example a specific degree of clearance or a specific degree of interference. The two components may be joined by mechanical interference, a process such as welding or brazing, or a combination thereof.

The dimensions of the main fuel ring 158 may be selected to that it is positioned at a desired location within the mixing channel 180. For example, it may be positioned in approximately the center of the mixing channel 180, or stated another way, approximately halfway between the main housing 142 and the main swirler body 174. In one example, it may be positioned to discharge fuel into a central portion of the mixing channel 180, "central portion" referring to a band approximately 50% of the radial height of the mixing channel 180 and centered halfway between the main housing 142 and the main swirler body 174.

The main swirler body 174 incorporates one or more swirlers each including a plurality of vanes configured to impart a tangential velocity component to air flowing therethrough.

In the illustrated example, the main swirler body 174 includes an upstream first main swirler 186 and a downstream second main swirler 188.

The first main swirler 186 is positioned upstream from the main fuel ring 158. As shown, the flow direction of the first main swirler 186 is oriented substantially radial to mixer centerline 134. The first main swirler 186 includes a plurality of first main swirl vanes 190. The first main swirl vanes 190 are angled with respect to the mixer centerline 134 so as to impart a swirling motion (i.e., tangential velocity component) to the air flow passing therethrough. More specifically, the first main swirl vanes 190 are disposed at an acute vane angle measured relative to a radial direction.

The second main swirler 188 is positioned overlapping the axial location of the main fuel ring 158 such that a portion of the second main swirler 188 is upstream from the main fuel ring 158 and a portion is downstream of the main fuel ring 158. The flow direction of the second main swirler 188 is oriented substantially radial to mixer centerline 134. The second main swirler 188 includes a plurality of second main swirl vanes 192. The second main swirl vanes 192 are angled with respect to the mixer centerline 134 so as to impart a swirling motion (i.e., tangential velocity component) to the air flow passing therethrough. More specifically, the second main swirl vanes 192 are disposed at an acute vane angle measured relative to an axial direction. The second main swirl vanes 192 may be oriented the same or opposite direction relative to the first main swirl vanes 190. Stated another way, both main swirlers 186, 188, may direct air in a clockwise or counterclockwise direction (co-rotating), or one main swirler may direct air in a clockwise direction while the other main swirler directs air in a counter-clockwise direction (contra-rotating).

Figure 6:
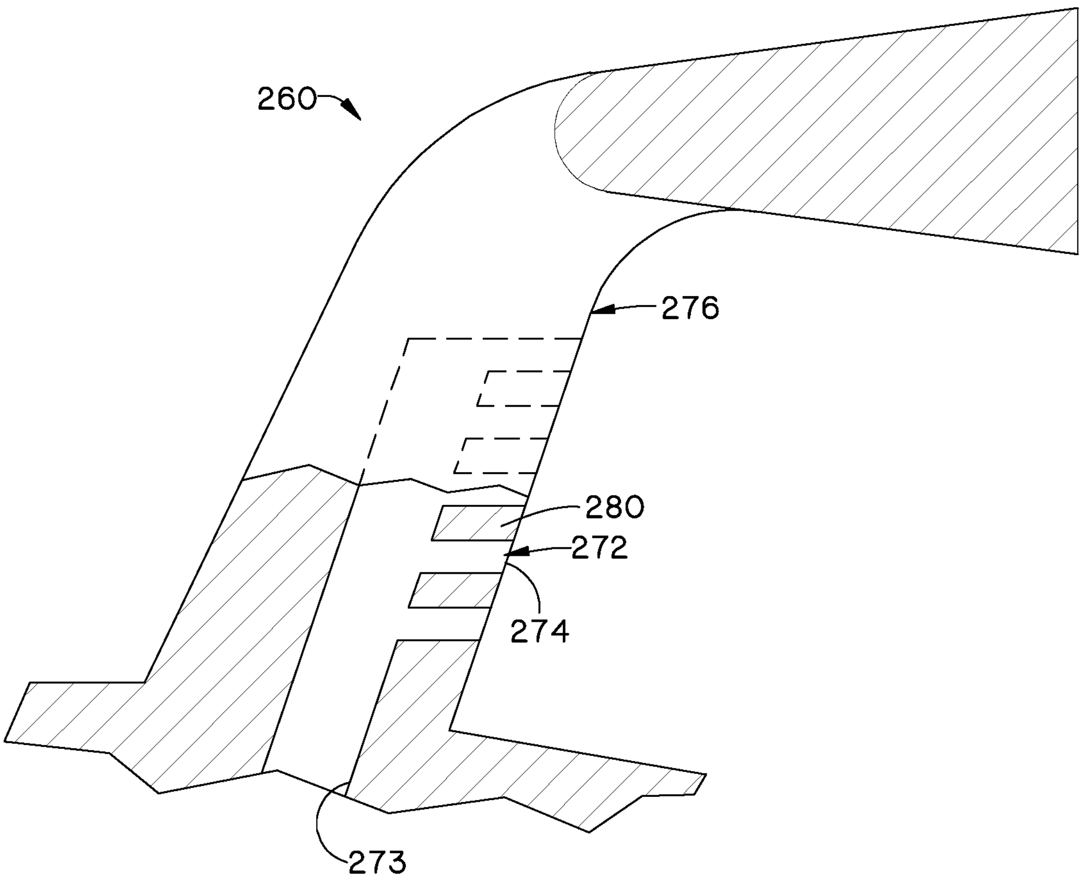
FIG. 6 is a cross-sectional view of an alternative main fuel ring construction.
Figure 7:
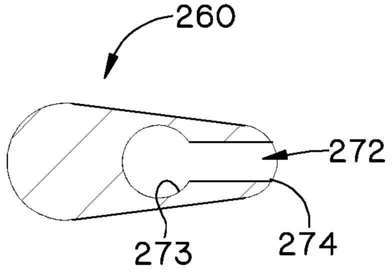
FIG. 7 is a cross-sectional view of a portion of the main fuel ring of FIG. 6.

In the example described above, the fuel injection ports 172 exit through the main fuel ring 158. Alternatively, or in addition to this structure, fuel may be discharged through the main fuel vanes 160. For example, FIGS. 6 and 7 illustrate an embodiment in which one or more main fuel vanes 260, which could be substituted for main fuel vanes 160, are provided with fuel injection ports 272. The fuel injection ports 272 may have cross-section shapes such as circular, elliptical, or polygonal. In the illustrated example, the individual fuel injection ports 272 each have an exit 274 at the trailing edge 276 of the main fuel vane 260. They are in flow communication with a fuel feed channel 273 inside the main fuel vane 260 that in turn communicates with a fuel manifold (not shown in this view) and are separated from each other by walls 280. The walls 280 are effective to generate shearing forces in the fuel flow to promote air/fuel mixing as well as reducing auto-ignition risk. As with the fuel injection ports 172 described above, the direction of discharge of fuel from the fuel injection ports 272 may be selected to suit a particular application. It may be purely axial, or may include some radial component inward or outward, and/or some tangential component.

The mixing assembly 114 is connected to a fuel system 113 of a known type, shown schematically in FIG. 2, operable to supply a flow of liquid fuel at varying flowrates according to operational need. The fuel system 113 supplies fuel to a pilot valve 115 or functionally equivalent structure which is ultimately in fluid communication with the pilot fuel nozzle 124. The fuel system 113 also supplies fuel to a main valve 117 or functionally equivalent structure which is ultimately in fluid communication with the fuel manifold 120.

The mixing assembly 114 is of a "staged" type meaning it is operable to selectively inject fuel through two or more discrete stages, each stage being defined by individual fuel flowpaths within the mixing assembly 114. The fuel flowrate may also be variable within each of the stages.

The operation of the mixing assembly 114 will now be explained relative to different engine operating conditions, with the understanding that a gas turbine engine requires more heat input and thus more fuel flow during high-power operation and less heat input and thus less fuel flow during low-power operation. During some operating conditions, both the pilot and main valves 115 and 117 are open. Liquid fuel flows under pressure from the pilot valve 115 and is discharged into pilot airflow P via the pilot fuel nozzle 124. The fuel subsequently atomizes and is carried downstream where it burns in the combustor 100. Liquid fuel also flows under pressure from the main valve 117 through the fuel manifold 120 and is discharged into mixer airflow M via the fuel injector ports 172. The fuel subsequently atomizes, is carried downstream, and burns in the combustor 16.

In a particular operating condition known as "pilot-only operation", the pilot fuel nozzle 124 continues to operate and the pilot valve 115 remains open, but the main valve 117 is closed. Initially after the main valve 117 is closed, downstream pressure rapidly equalizes with the prevailing air pressure in the mixer airflow M and fuel flow through the fuel injector ports 172 stops. If the fuel were to remain in the main fuel ring 158 it would be subject to coking as described above. One purpose of the present invention is to reduce or prevent such coking. To achieve the technical effect of reducing or preventing coking during the aforementioned pilot-only operation, the action of a purge process, may act to positively evacuate the fuel from the mixing assembly 114, beginning at the fuel injector ports 172 and moving upstream.

The purge method and configuration will now be explained in more detail. As noted above, the main fuel ring 158 communicates with an array of fuel injector ports 172 around the periphery of the outer surface 148 of the main housing 142. The fuel injector ports 172 may be arranged such that different fuel injector ports 172 are exposed to different static pressures.

For example, some of the fuel injector ports 172 may be exposed to the generally prevailing static pressure in the mixer airflow M. For purposes of description these are referred to herein as "neutral pressure ports." Some of the fuel injector ports 172 may be exposed to reduced static pressure relative to the prevailing static pressure in the mixer airflow M. For purposes of description these are referred to herein as "low pressure ports." Some of the fuel injector ports 172 may be exposed to increased static pressure relative to the prevailing static pressure in the mixer airflow M. For purposes of description these are referred to herein as "high pressure ports."

Figure 8:
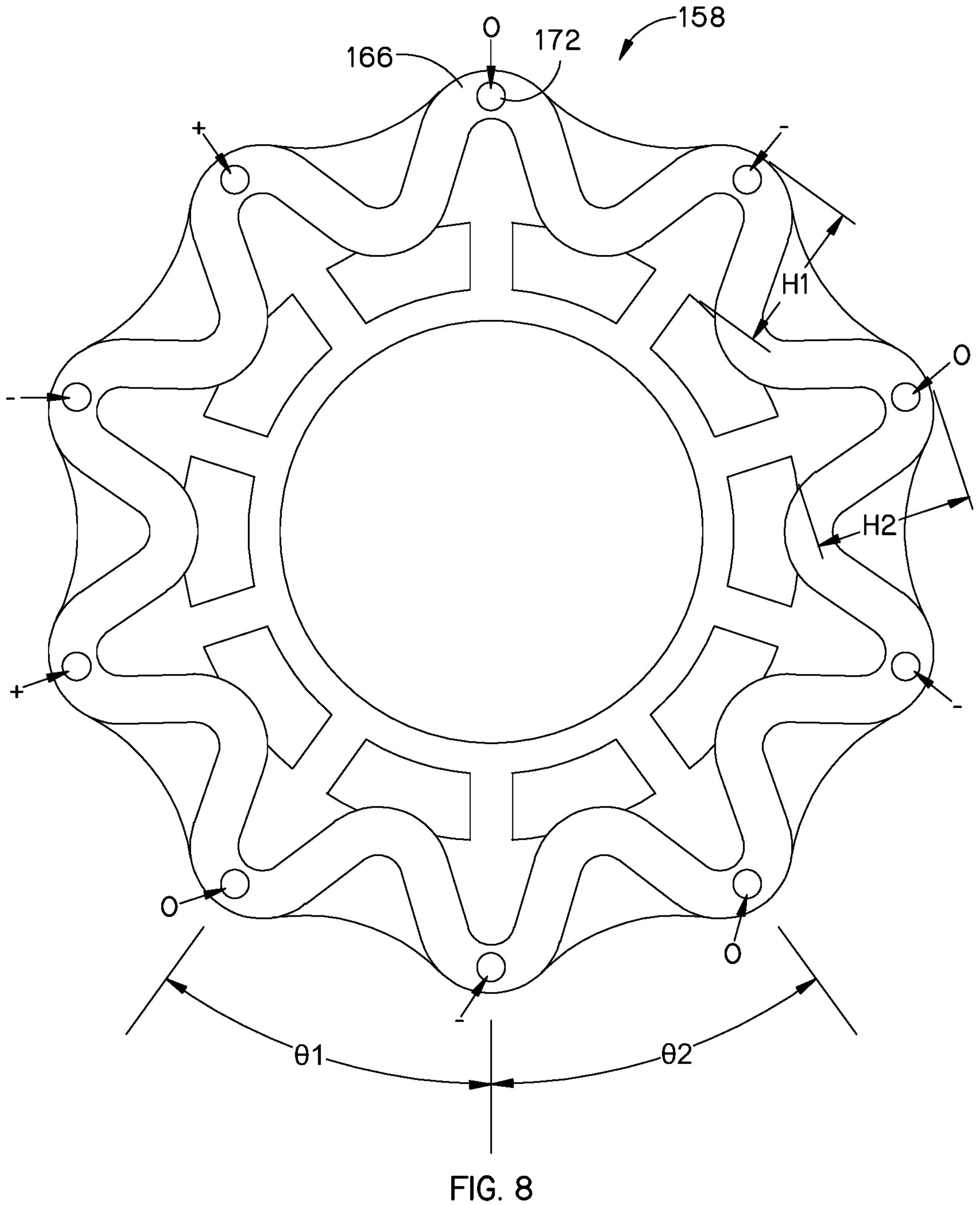
FIG. 8 is an aft elevation view of the main fuel ring shown in FIG. 3.

Referring to FIG. 8, neutral pressure ports (marked with a zero) may alternate with low pressure ports (marked with a minus sign) and/or high pressure ports (marked with a plus sign). The local static pressure differences between adjacent ports drive flow of the remaining fuel to evacuate the main fuel ring 158 and/or fuel manifold 120. As shown by the arrows in the figure, in one exemplary flow path, air enters the neutral ports (0), driving the fuel to flow from the neutral ports (0), tangentially in the fuel manifold 120 towards the low-pressure ports (–), and exits the low-pressure ports (–). In another example flow path, air enters the pressure ports (+), driving the fuel to flow from the high-pressure ports (+) tangentially in the fuel manifold 120 to the neutral ports (0), and exits the neutral ports (0). This rapidly purges the main fuel ring 158 and/or fuel manifold 120 and evacuates fuel therefrom.

The ports may be arranged in any configuration that will generate a pressure differential effective to drive a port-to-port purge. For example, positive pressure ports could alternate with neutral pressure ports, or positive pressure ports could alternate with negative pressure ports.

Various physical configurations may be employed to create the static pressure differences described above. For example, the size and/or spacing of the corrugations described above may be non-uniform. In one example, the radial height "H1" of a first one of the outward peaks 166 may be different from a radial height "H2" of a second one of the outward peaks 166. This will have the technical effect of changing the radial positions of the fuel injector ports 172 corresponding to the different height peaks, thus exposing them to different static pressures.

In another example, the angle θ1 between first and second ones of the outward peaks 166 may be different than the angle θ2 between second and third ones of the outward peaks 166. This will have the technical effect of changing the locations of the fuel injector ports 172 corresponding to the different peaks, giving them a nonuniform circumferential spacing, thus exposing the different static pressures.

Figure 9:
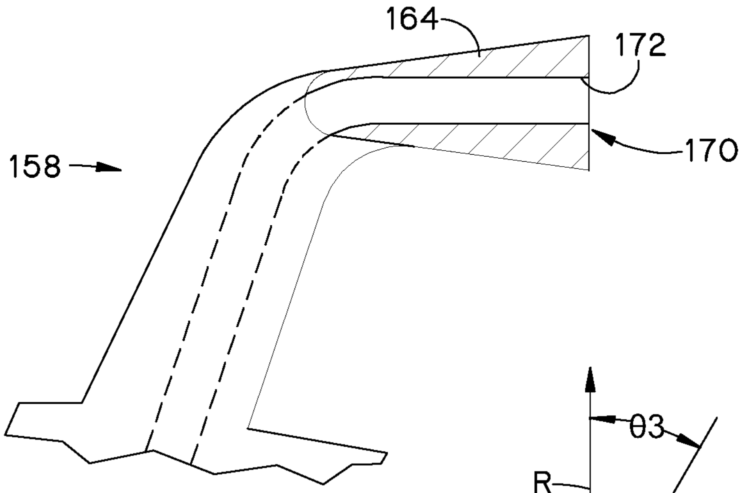
FIG. 9 is a cross-sectional view of one possible configuration of a portion of the main fuel ring of FIG. 8.
Figure 10:
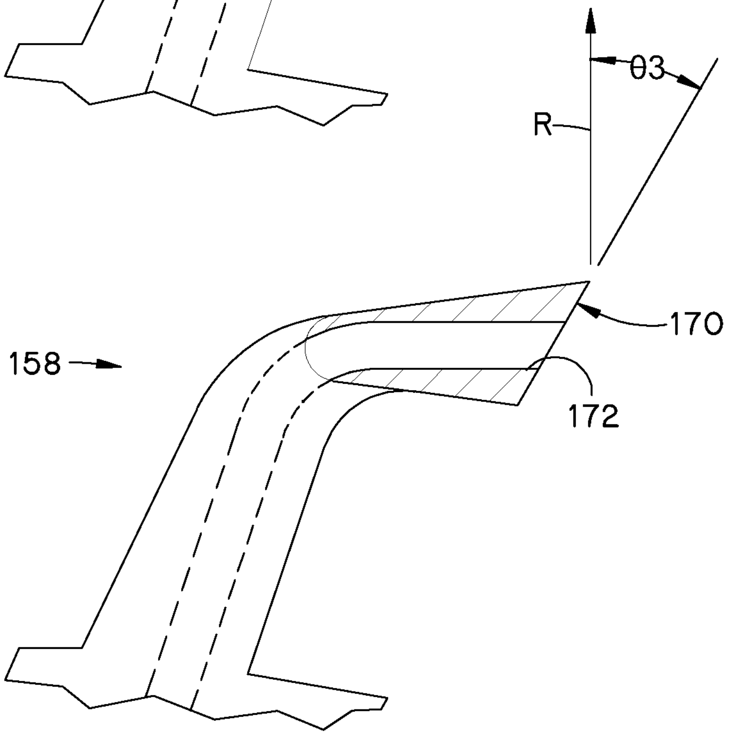
FIG. 10 is a cross-sectional view of one possible configuration of a portion of the main fuel ring of FIG. 8.
Figure 11:
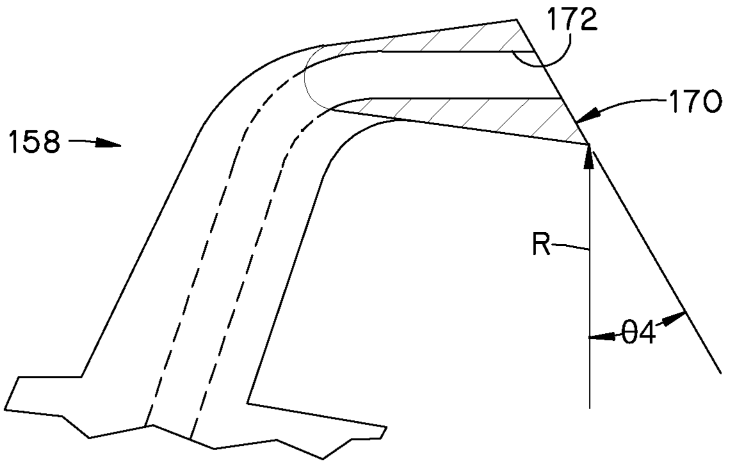
FIG. 11 is a cross-sectional view of one possible configuration of a portion of the main fuel ring of FIG. 8.

FIGS. 9-11 show optional configurations of the main fuel ring 158, specifically the shaping of the aft-facing surface 170 of the aft portion 164. These are further examples of physical configurations which may be employed to create the static pressure differences described above. FIG. 9 illustrates a baseline reference configuration in which the aft-facing surface 170 is substantially parallel to the radial direction "R". In this configuration the associated fuel injector port 172 would be a "neutral port" as described above.

FIG. 10 illustrates a variation in which the aft-facing surface 170 is tilted or angled at a oblique angle "θ3" to the radial direction R. More specifically, the aft-facing surface 170 faces partially radially inboard. In this configuration the associated fuel injector port 172 would be a "low-pressure port" or a "high-pressure port" as described above.

FIG. 11 illustrates a variation in which the aft-facing surface 170 is tilted or angled at a oblique angle "04" to the radial direction R. More specifically, the aft-facing surface 170 faces partially radially outboard. In this configuration the associated fuel injector port 172 would be a "low-pressure port" or a "high-pressure port" as described above.

Any combination of the fuel injector port constructions show in FIGS. 9-11 could be implemented in the main fuel ring 158 of FIG. relate to result in a desired arrangement of neutral, high-pressure, and/or low-pressure ports.

Figure 12:
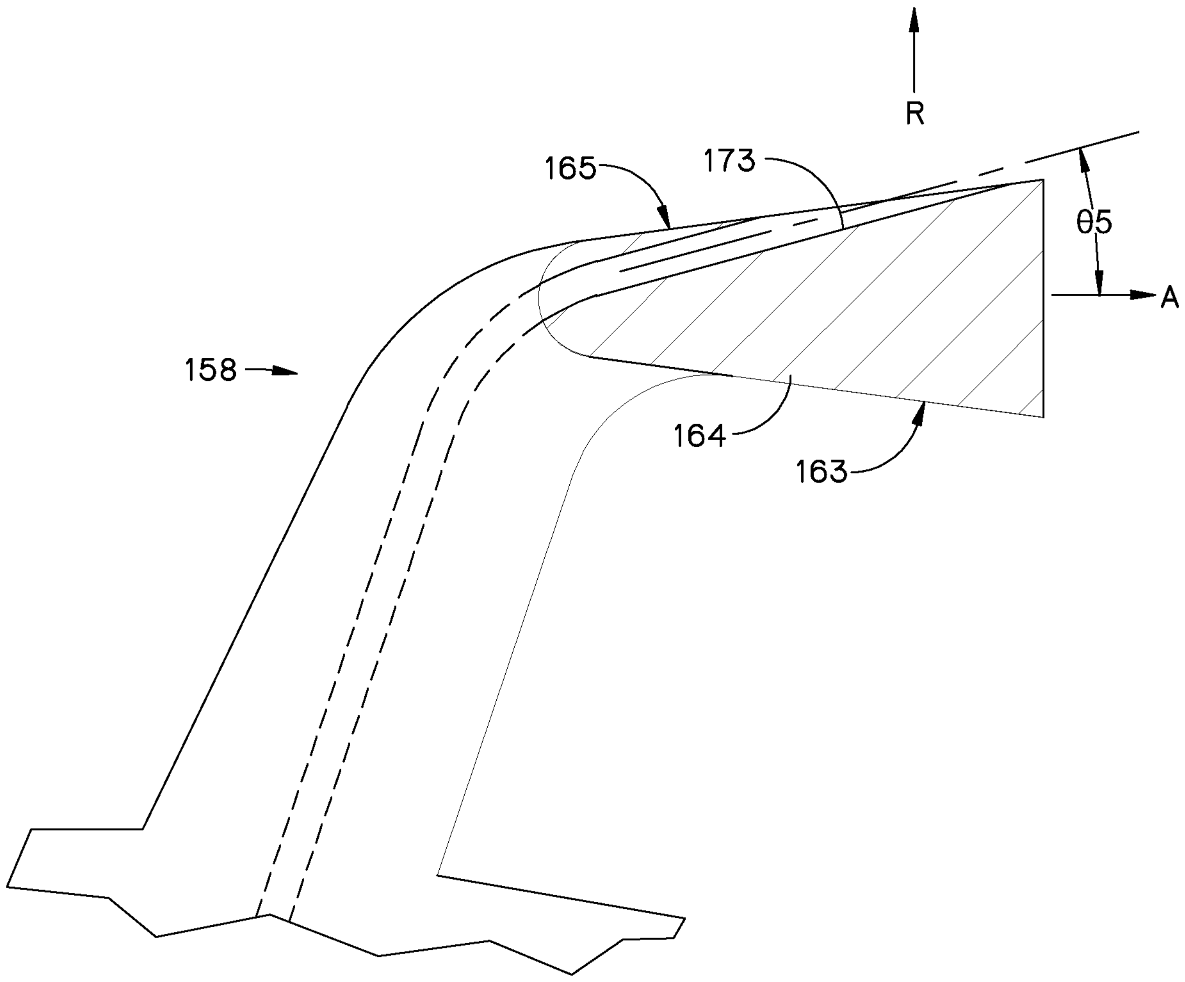
FIG. 12 is a cross-sectional view of one possible configuration of a portion of the main fuel ring of FIG. 8.

FIG. 12 illustrates another variant fuel injector portion configuration which may be used to manipulate static pressure. In this example, the aft-facing surface 170 is substantially parallel to the radial direction "R". A fuel injector port 173 passes through the outboard surface 165 of the aft portion 164 of the main fuel ring 158. It is oriented at a oblique angle "θ5" to the axial direction "A" and operates as a "jet-in-cross-flow" (JIC) type injector, discharging at least partially in a radial direction. Alternatively, the fuel injector port 173 could exit through the inboard surface 163 of the aft portion 164 of the main fuel ring 158. Stated another way, its position could be mirrored about the axial direction A relative to the illustrated position. In either case. the fuel injector port 173 would be a "low-pressure port" or a "high-pressure port" as described above.

Figure 13:
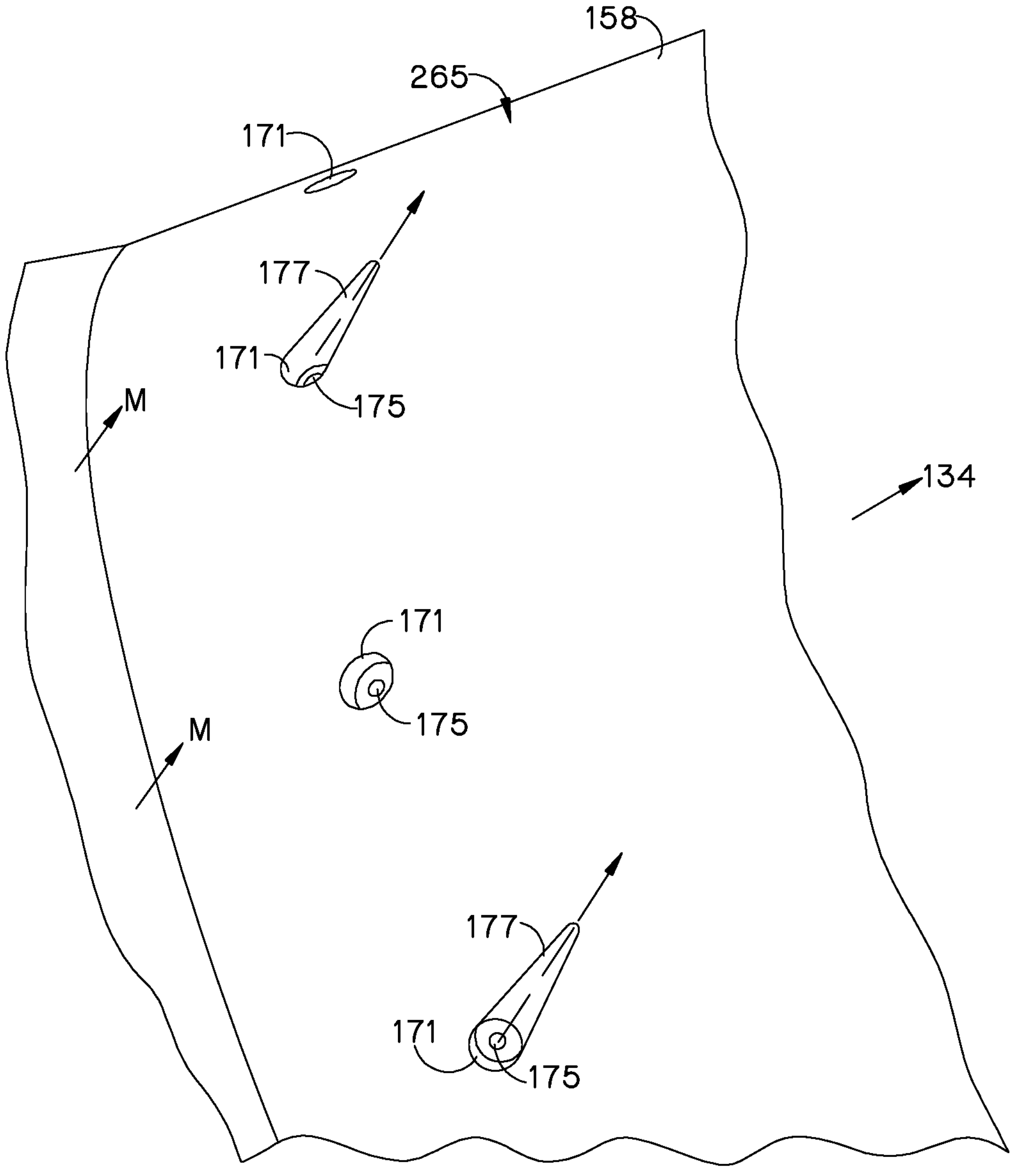
FIG. 13 is a perspective view of a portion of a main fuel ring, showing the exterior surface thereof.

Optionally, fuel injector ports may be implemented in combination with spray wells and/or scarfs. FIG. 13 shows a representative main fuel ring outer surface 265 (shown as cylindrical for the sake of simplicity) having an array of JIC-type fuel injector ports 175. Each fuel injector port 175 communicates with a single spray well 171 on the periphery of the main fuel ring 158. The mixer airflow M exhibits "swirl," that is, its velocity has both axial and tangential components relative to the mixer centerline 134. As shown in FIG. 13, the spray wells 171 may be arranged such that alternating fuel injector ports 175 are exposed to different static pressures. For example, each of the fuel injector ports 175 not associated with a scarf 177 is exposed to the generally prevailing static pressure in the mixer airflow M and would be a neutral pressure port as described above. Each of the fuel injector ports 175 associated with a "downstream" scarf 177 is exposed to reduced static pressure relative to the prevailing static pressure in the mixer airflow M and would be a low pressure ports as described above. While not shown, it is also possible that one or more scarfs 177 could be oriented opposite to the orientation of the downstream scarfs 177. These would be "upstream scarfs" and the associated fuel injector ports 175 would be exposed to increased static pressure relative to the prevailing static pressure in the mixer airflow M. These would be high pressure ports as described above.

Figure 14:
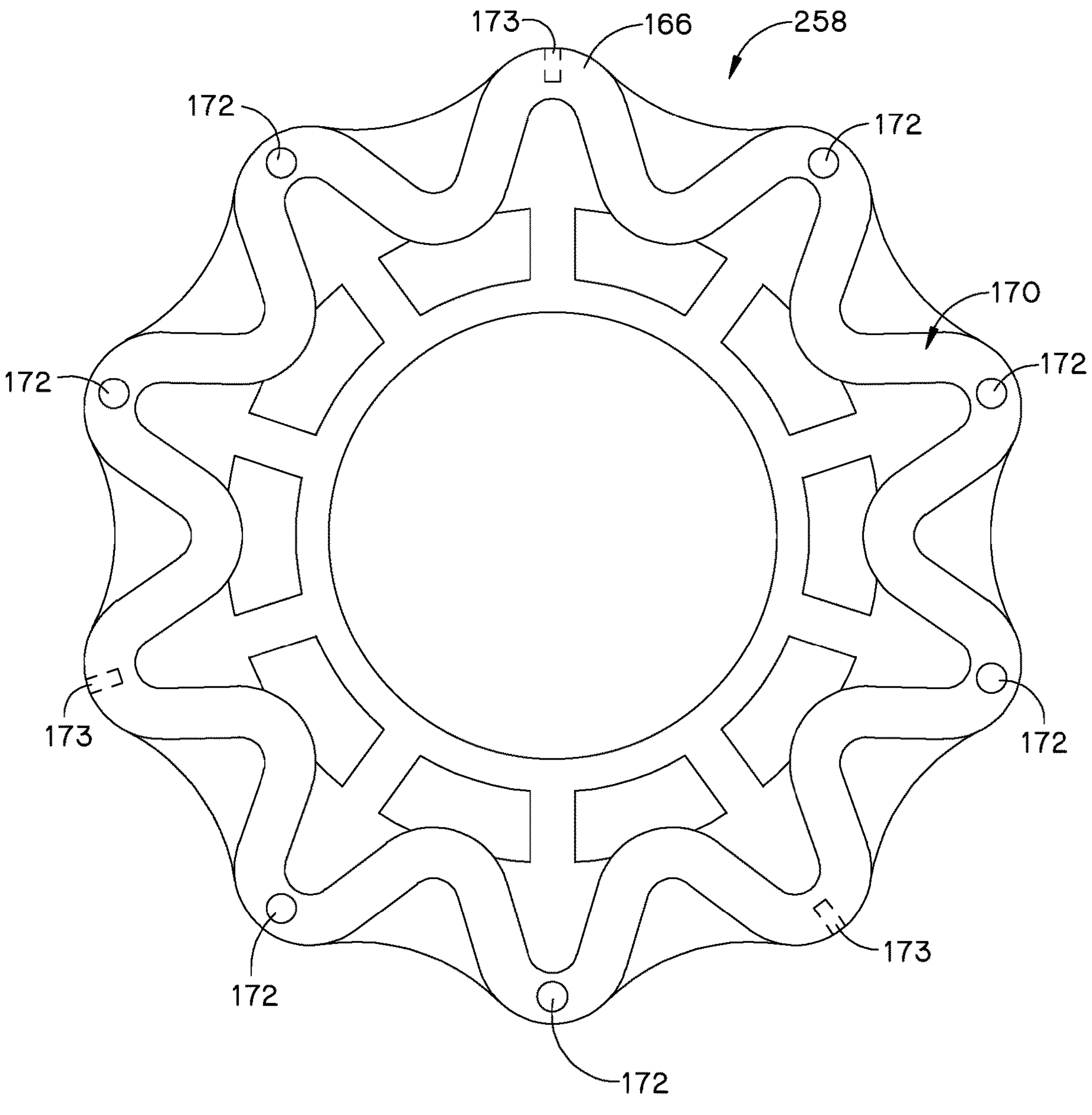
FIG. 14 is an aft elevation view of an alternative construction of a main fuel ring.

Various physical configurations may be employed to create the static pressure differences described above. FIG. 14 shows a configuration of a main fuel ring 258, having some fuel injector ports 172 exiting through the aft-facing surface 170, configured as in FIG. 9, 10, or 11 above, and some fuel injector ports 173 configured as JIC ports as in FIG. 12 or 13 above.

Figure 15:
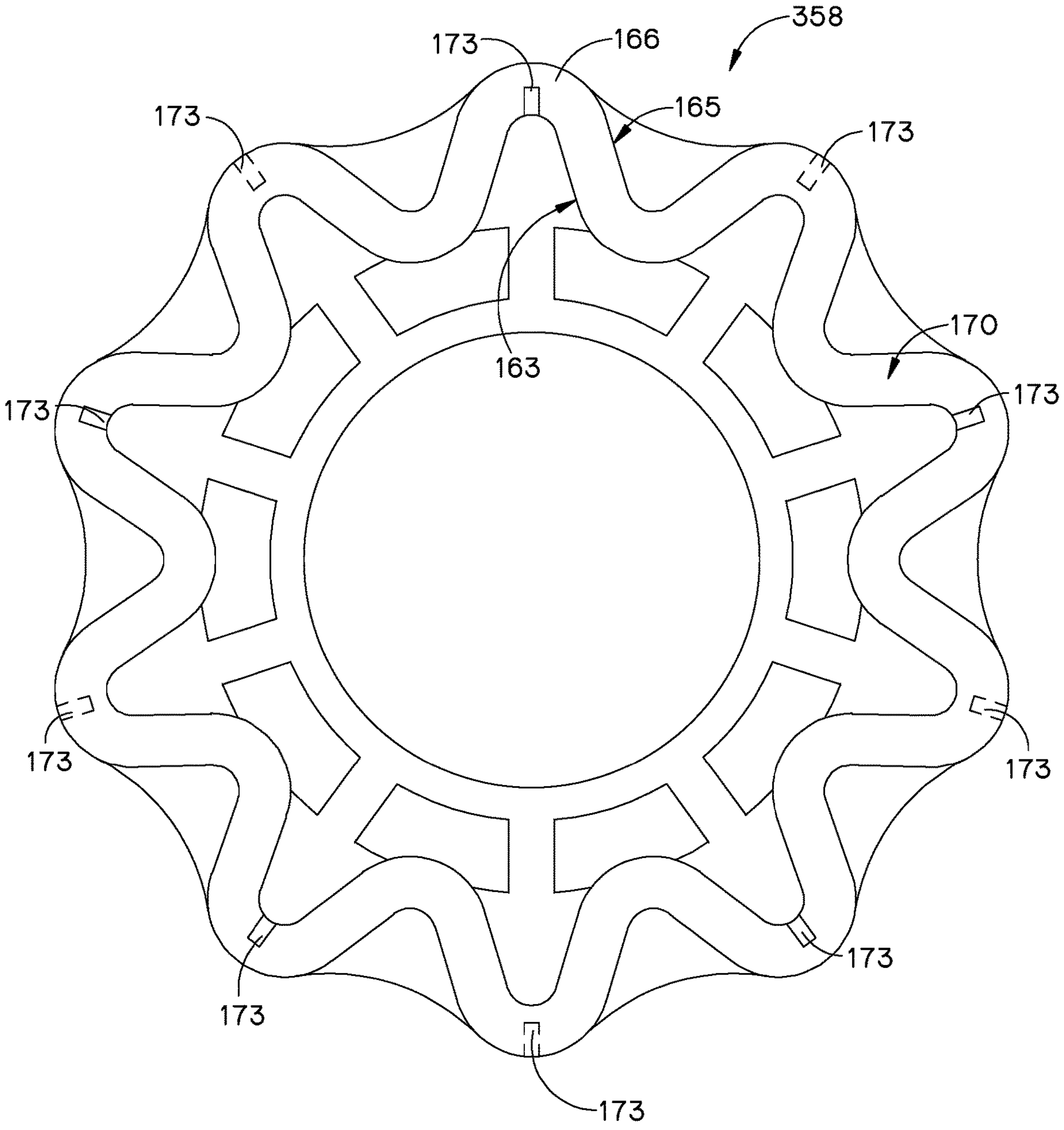
FIG. 15 is an aft elevation view of an alternative construction of a main fuel ring.

FIG. 15 is an example of another physical configuration which may be employed to create the static pressure differences described above. A main fuel ring 358, has some fuel injector ports 173 configured as JIC ports as in FIG. 12 or 13 above and exiting through the opposed outboard surface 165, for example at the convex outward peaks 166, and some fuel injector ports 173 configured as JIC ports passing through the inboard surface 163, for example at the convex outward chutes 168. This would have the technical effect of exposing the differently-positioned fuel injector ports 173 to different static pressures.

Figure 16:
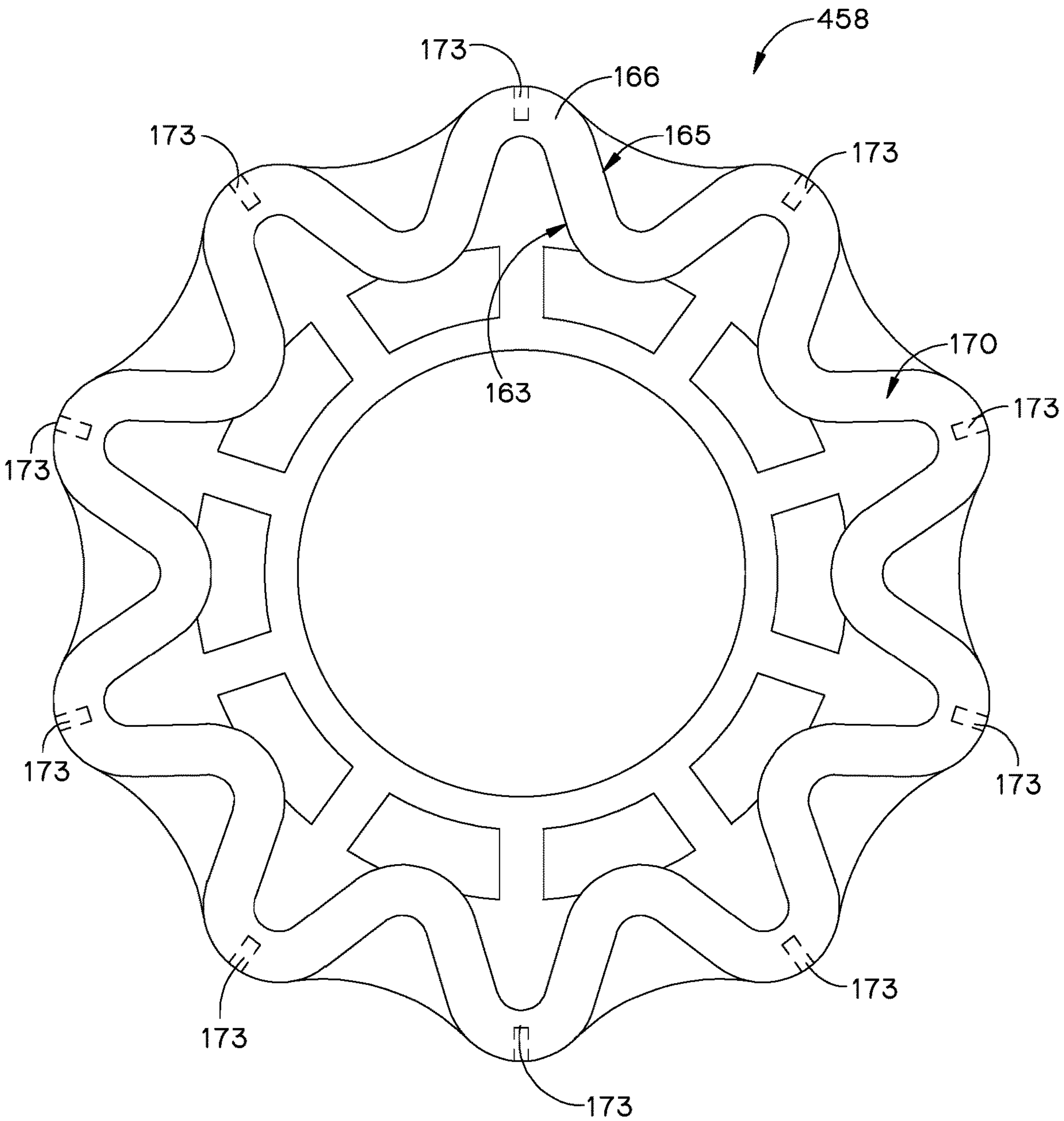
FIG. 16 is an aft elevation view of an alternative construction of a main fuel ring.

FIG. 16 is an example of another physical configuration which may be employed to create the static pressure differences described above. A main fuel ring 458, has some fuel injector ports 173 configured as JIC ports as in FIG. 12 or 13 above, employing scarfs, and exiting through the outboard surface 165, for example at the convex outward peaks 166, and some fuel injector ports 173 configured as JIC ports passing through the outboard surface 165, for example at alternate ones of the convex outward peaks 166. This would have the technical effect of exposing the differently-positioned fuel injector ports 173 to different static pressures.

Figure 17:
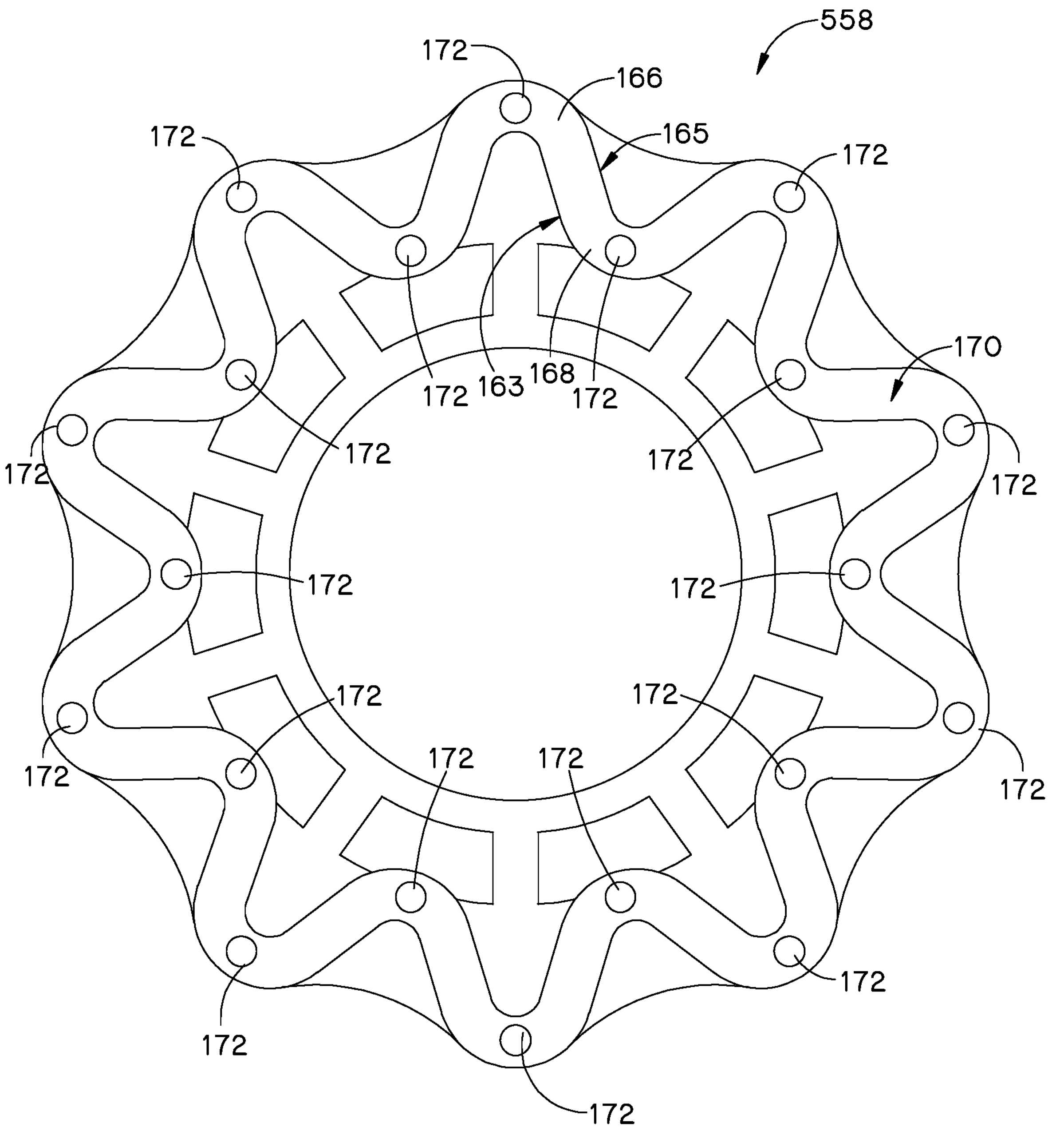
FIG. 17 is an aft elevation view of an alternative construction of a main fuel ring.

FIG. 17 is an example of another physical configuration which may be employed to create the static pressure differences described above. A main fuel ring 558 has fuel injector ports 172 exiting through the aft-facing surface 170. Some of the fuel injector ports 172 exit through the aft-facing surface 170 at the convex outward peaks 166, and others of the fuel injector ports 172 exit through the aft-facing surface 170 at the concave outward chutes 168. This would have the technical effect of exposing the differently-positioned fuel injector ports 172 to different static pressures.

The purge configuration described herein has advantages over the prior art. It has the capability to reduce or eliminate coking.

The foregoing has described a purge configuration for a combustor. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Additional aspects of the present invention are provided by the following numbered clauses:

1. A mixing assembly for a combustor, comprising: a pilot mixer including an annular pilot housing having a hollow interior extending along a mixer centerline and a pilot fuel nozzle mounted in the housing; a main mixer including: a main housing surrounding the pilot, the main housing having forward and aft ends; a fuel manifold positioned between the pilot housing and the main housing; a mixer foot extending outward from the main housing; a main swirler body including a plurality of vanes, the main swirler body surrounding the main housing such that an annular mixing channel is defined between the main housing and the main swirler body, and being coupled to the mixer foot; and a main fuel ring disposed in the mixing channel downstream of the mixer foot and connected to the main housing by an array of main fuel vanes, at least one of the main fuel ring and the main fuel vanes including a plurality of fuel injection ports positioned to discharge fuel into a central portion of the mixing channel, wherein the fuel injection ports are disposed non-uniformly relative to the mixer centerline, so as to produce a static pressure difference therebetween in response to mixer air flow passing around the main fuel ring.

2. The mixing assembly of any preceding clause wherein the main fuel ring includes an aft-facing surface at least some of the fuel injection ports pass through the aft-facing surface; and a portion of the aft-facing surface is tilted at an oblique angle to a radial direction relative to the mixer centerline.

3. The mixing assembly of any preceding clause wherein a portion of the aft-facing surface faces partially radially inboard.

4. The mixing assembly of any preceding clause wherein a portion of the aft-facing surface faces partially radially outboard.

5. The mixing assembly of any preceding clause wherein the main fuel ring includes and an inboard surface, an outboard surface, and an aft-facing surface interconnecting the inboard and outboard surfaces; at least some of the fuel injection ports pass through the outboard surface or the inboard surface.

6. The mixing assembly of any preceding clause wherein the fuel injection ports that pass through the outboard surface or the inboard surface are disposed at an oblique angle relative to the mixer centerline.

7. The mixing assembly of any preceding clause wherein at least some of the fuel injection ports pass through the aft-facing surface.

8. The mixing assembly of any preceding clause wherein the inboard or outboard surface that the fuel injection ports pass through includes an array of spray wells formed therein, each spray well being aligned with one of the fuel injection ports; and wherein some of the spray wells incorporate a scarf comprising a ramped portion of the exterior surface which is oriented at an acute angle to the mixer centerline.

9. The mixing assembly of any preceding clause wherein an aft portion of the main fuel ring includes a plurality of corrugations defining alternating convex outward peaks and concave outward chutes.

10. The mixing assembly of any preceding clause wherein: the main fuel ring includes an inboard surface, an outboard surface, and an aft-facing surface interconnecting the inboard and outboard surfaces; at least some of the fuel injection ports pass through the aft-facing surface.

11. The mixing assembly of any preceding clause wherein: some of the fuel injection ports that pass through the aft-facing surface exit at the peaks; and some of the fuel injection ports that pass through the aft-facing surface exit at the chutes.

12. The mixing assembly of any preceding clause wherein: the fuel injection ports that pass through the aft-facing surface exit at the peaks; and the radial heights of the peaks are non-uniform such that the fuel injection ports that pass through the aft-facing surface are at varying radial distances from the mixer centerline.

13. The mixing assembly of any preceding clause wherein: the fuel injection ports that pass through the aft-facing surface exit at the peaks; and angular separation between adjacent ones of the peaks are non-uniform such that the fuel injection ports that pass through the aft-facing surface are at a nonuniform circumferential spacing.

14. The mixing assembly of any preceding clause wherein at least some of the fuel injection ports pass through the outboard surface or the inboard surface.

15. The mixing assembly of any preceding clause wherein some of the fuel injection ports pass through the outboard surface and some of the fuel injection ports pass through the inboard surface.

16. The mixing assembly of any preceding clause wherein the fuel injection ports that pass through the outboard surface or the inboard surface are disposed at an oblique angle relative to the mixer centerline.

17. The mixing assembly of any preceding clause wherein at least some of the fuel injection ports pass through the aft-facing surface.

18. The mixing assembly of any preceding clause wherein: the inboard or outboard surface that the fuel injection ports pass through includes an array of spray wells formed therein, each spray well being aligned with one of the fuel injection ports; and wherein some of the spray wells incorporate a scarf comprising a ramped portion of the exterior surface which is oriented at an acute angle to the mixer centerline.

19. The mixing assembly of any preceding clause in combination with an annular inner liner and an annular outer liner spaced apart from the inner liner, wherein the mixing assembly of any preceding clause is disposed at an upstream end of the inner and outer liners.

20. The mixing assembly of any preceding clause further comprising a fuel system operable to supply a flow of liquid fuel; a pilot valve which is coupled to the fuel system and to the pilot fuel nozzle; and a main valve which is coupled to the fuel system and to the fuel injection ports.

What is claimed is:

1. A mixing assembly for a combustor, comprising:

a pilot mixer including an annular pilot housing having a hollow interior extending along a mixer centerline and a pilot fuel nozzle mounted in the annular pilot housing;

a main mixer including:

a main housing surrounding the pilot mixer, the main housing having forward and aft ends;

a fuel manifold positioned between the annular pilot housing and the main housing;

a mixer foot extending outward from the main housing;

a main swirler body including a plurality of vanes, the main swirler body surrounding the main housing such that an annular mixing channel is defined between the main housing and the main swirler body, and being coupled to the mixer foot;

a main fuel ring disposed in the annular mixing channel downstream of the mixer foot and connected to the main housing by an array of main fuel vanes, at least one of the main fuel ring and the array of main fuel vanes including a plurality of fuel injection ports positioned to discharge fuel into a central portion of the annular mixing channel; and wherein the fuel injection ports are disposed non-uniformly relative to the mixer centerline, so as to produce a static pressure difference therebetween in response to mixer air flow passing around the main fuel ring.

2. The mixing assembly of claim 1 wherein the main fuel ring includes an aft-facing surface;

at least some of the fuel injection ports pass through the aft-facing surface; and a portion of the aft-facing surface is tilted at an oblique angle to a radial direction relative to the mixer centerline.

3. The mixing assembly of claim 2 wherein the portion of the aft-facing surface faces partially radially inboard.

4. The mixing assembly of claim 2 wherein the portion of the aft-facing surface faces partially radially outboard.

5. The mixing assembly of claim 1 wherein the main fuel ring includes an inboard surface, an outboard surface, and an aft-facing surface interconnecting the inboard surface and the outboard surface;

at least some of the fuel injection ports pass through the outboard surface or the inboard surface.

6. The mixing assembly of claim 5 wherein the fuel injection ports that pass through the outboard surface or the inboard surface are disposed at an oblique angle relative to the mixer centerline.

7. The mixing assembly of claim 5 wherein at least some of the fuel injection ports pass through the aft-facing surface, the at least some of the fuel injection ports that pass through aft-facing surface being different than the at least some of the fuel injection ports that pass through the outboard surface or the inboard surface.

8. The mixing assembly of claim 5 wherein:

the inboard surface or the outboard surface that the fuel injection ports pass through includes an array of spray wells formed therein, each spray well being aligned with one of the fuel injection ports; and wherein some of the spray wells of the array of spray wells incorporate a scarf comprising a ramped portion of an outer surface of the main fuel ring, the ramped portion being oriented at an acute angle to the mixer centerline.

9. The mixing assembly of claim 1 wherein an aft portion of the main fuel ring includes a plurality of corrugations defining alternating convex outward peaks and concave outward chutes.

10. The mixing assembly of claim 9 wherein:

the main fuel ring includes an inboard surface, an outboard surface, and an aft-facing surface interconnecting the inboard surface and the outboard surface; and at least some of the fuel injection ports pass through the aft-facing surface.

11. The mixing assembly of claim 10 wherein:

a first group of the fuel injection ports that pass through the aft-facing surface exit at the convex outward peaks; and a second group of the fuel injection ports that pass through the aft-facing surface exit at the concave outward chutes.

12. The mixing assembly of claim 11 wherein:

the convex outward peaks include radial heights that are non-uniform such that the first group of fuel injection ports are at varying radial distances from the mixer centerline.

13. The mixing assembly of claim 11 wherein:

angular separation between adjacent ones of the convex outward peaks are non-uniform such that the first group of fuel injection ports are at a non-uniform circumferential spacing.

14. The mixing assembly of claim 10 wherein at least some of the fuel injection ports pass through the outboard surface or the inboard surface, the at least some of the fuel injection ports that pass through the outboard surface or the inboard surface are different than the at least some of the fuel injection ports that pass through the aft-facing surface.

15. The mixing assembly of claim 14 wherein the fuel injection ports that pass through the outboard surface or the inboard surface includes a first group of fuel injection ports that pass through the outboard surface and a second group of fuel injection ports that pass through the inboard surface.

16. The mixing assembly of claim 14 wherein the fuel injection ports that pass through the outboard surface or the inboard surface are disposed at an oblique angle relative to the mixer centerline.

17. The mixing assembly of claim 14 wherein:

the inboard surface or the outboard surface that the fuel injection ports pass through includes an array of spray wells formed therein, each spray well being aligned with one of the fuel injection ports; and wherein some of the spray wells of the array of spray wells incorporate a scarf comprising a ramped portion of an outer surface of the main fuel ring, the ramped portion being oriented at an acute angle to the mixer centerline.

18. The mixing assembly of claim 1 wherein the main fuel ring includes an aft-facing surface; and at least some of the fuel injection ports pass through the aft-facing surface.

19. The mixing assembly of claim 1 in combination with an annular inner liner and an annular outer liner spaced apart from the annular inner liner, wherein the mixing assembly of claim 1 is disposed at an upstream end of the annular inner liner and the annular outer liner.

20. The mixing assembly of claim 1 further comprising a fuel system operable to supply a flow of liquid fuel;

a pilot valve which is coupled to the fuel system and to the pilot fuel nozzle; and a main valve which is coupled to the fuel system and to the fuel injection ports.

* * * * *